Nov. 19, 1935.　　　　　J. A. REYNIERS　　　　　2,021,242
DETACHABLE BACK FOR SEATS
Filed Dec. 23, 1933
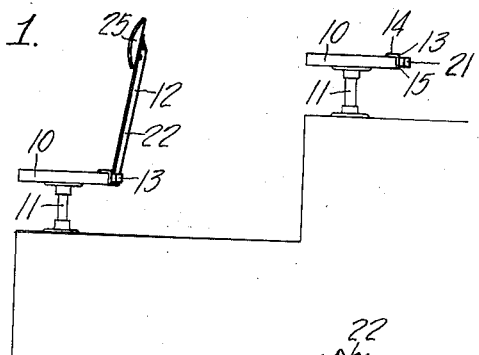
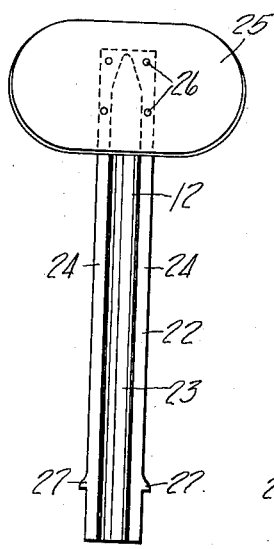
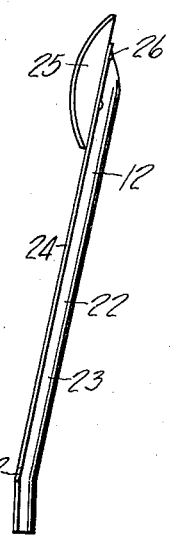
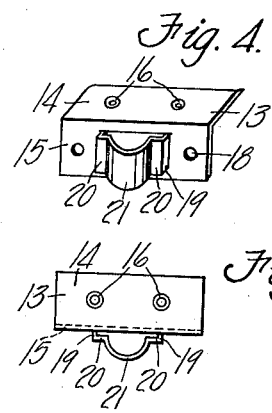
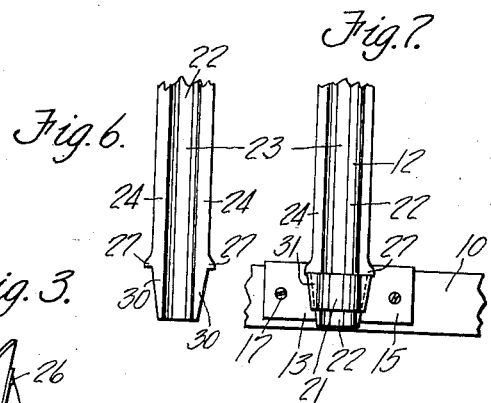
INVENTOR.
James A. Reyniers.
BY
ATTORNEY.

Patented Nov. 19, 1935

2,021,242

UNITED STATES PATENT OFFICE 2,021,242

DETACHABLE BACK FOR SEATS

James A. Reyniers, South Bend, Ind.

Application December 23, 1933, Serial No. 703,749

5 Claims. (Cl. 155—133)

The invention relates to detachable backs or back rests for seats, and particularly for bleacher seats in football stadiums, baseball parks, and the like, where the seats comprise backless benches or elongated planks.

The primary object of the invention is to provide a back rest which may readily and easily be applied to a backless seat or bench.

A further object is to provide means carried by a backless seat or bench by which a detachable back rest may be readily operatively supported and positioned.

A further object is to provide a back rest with a tapered portion which fits into a suitable supporting means therefor.

A further object is to provide a back rest of strong and light weight construction.

A further object is to provide means for supporting a detachable back rest having a socket formed therein of configured shape for properly supporting and positioning said back rest therein.

A further object is to provide a seat with a back rest supporting means and a back rest having means engaging said supporting means for operatively positioning said back rest relative to said seat.

With the above and other objects in view, the invention resides in the construction and combination of parts as hereinafter set forth, shown in the drawing, described and claimed, it being understood that changes in the precise embodiment of the invention may be made within the scope of what is claimed without departing from the spirit of the invention.

In the drawing:

Figure 1 is a side view of a group of seats in a stadium illustrating my detachable back rest mounted on one seat.

Figure 2 is a view of my back rest in front elevation.

Figure 3 is a view of my back rest in side elevation.

Figure 4 is a perspective view of the back rest mounting bracket.

Figure 5 is a top plan view of the bracket.

Figure 6 is a fragmentary view, in front elevation, of a modified form of back rest.

Figure 7 is a fragmentary rear view of the modified back rest and bracket therefor mounted on a seat.

Referring to the drawing, the numeral 10 designates a conventional stadium or bleacher seat, which usually takes the form of an elongated plank, suitably supported, as by member 11, on a stepped foundation or structure, as illustrated in Figure 1. The seats or benches are uncomfortable when occupied for a period of several hours, as when watching a football, baseball or other game, by reason of the fact that that they are not supplied with back rests. To provide permanent elongated back rests for these seats would involve considerable expense, would render a stadium or the like difficult to clean, and would render access to and from the seats in a crowd difficult. I have therefore provided a detachable back rest 12 which may readily and easily be operatively applied to, and removed from, a seat; and which will enable the occupant of the seat to sit comfortably for a long period of time.

The back rest 12 is supported or mounted by a suitable bracket 13 which is preferably formed of an angle iron or of sheet metal, and which comprises flanges 14 and 15. The bracket is applied to the upper rear side of the seat 10 at the center thereof, with flange 14 lying in face contacting relation to the upper side of the seat and secured thereto by countersunk screws or bolts passing through countersunk apertures 16 of the flange and into the seat. The other flange 15 of the bracket bears upon the rear edge of the seat and is secured thereto by screws 17 passing through flange apertures 18 and into the seat. The bracket is thus securely mounted on the seat, and strains applied thereto need not be taken entirely by the securing means thereof. A portion of flange 15 intermediate the edges thereof is outwardly stamped or off-set to form a socket comprising spaced outwardly directed flanges 19 extending perpendicularly of flange 15, flanges 20 extending inwardly of flanges 19 in aligned relation and parallel to flange 15, and an intermediate curved or arcuate portion 21 connecting said flanges 20. The socket thus produced is open at its upper and lower ends.

The back rest 12 comprises a stile or support 22 which is preferably formed of sheet metal which is transversely configured to provide a central curved or arcuate portion 23 and aligned flanges 24 extending from the opposite sides of said arcuate portion. A curved plate 25 is secured to the upper end of back support 22 by rivets 26, or the like. In spaced relation above the lower end of back support 22, ears 27 are provided, which ears are preferably formed integrally with and extend outwardly of flanges 24. The portion of the back support below ears 27 preferably extends at an angle to the major portion thereof, as shown in Figure 3.

The seat 10 which mounts bracket 13 cooperates therewith to form a socket for the reception of back support 22 of back rest 12. The lower end of back support 22 is inserted in this socket, and the ears 27 rest upon the upper edges of the socket to correctly position the back rest relative to the seat. The flanges 24 of back support 22 have face contacting engagement with flanges 20 of the socket and with the flange or face plate 15 of bracket 13, and the side edges of said flanges 24 have a sliding engagement with flanges 19 of the socket. The curved central portion 23 of back support 22 fits in and conforms to the contour of the curved portion 21 of the socket. The back support or stile 22 of the back rest is thus properly positioned and adequately supported by the socket, and the cross sectional configuration thereof, in addition to properly positioning back support 22, also reinforces the same. The angular positioning of the lower socket-carried and the upper portion of back support 22 provides the back rest with a natural rearward inclination to comfortably support the back of an occupant of the seat. The back rest may be easily applied to and removed from the bracket, and each seat has a individual back rest.

A modified construction of the back rest support 22 and the mounting bracket therefor is illustrated in Figures 6 and 7. In this construction the portions 30 of the flanges 24 of back support 22 are downwardly and inwardly tapered from the ears 27 to the lower end thereof. The bracket 13 above described, or a modified bracket as shown in Figure 7 may be employed to mount this modified back support. The bracket 13 illustrated in Figure 7 provides a socket comprising the central arcuate portion 21 from which aligned flanges 31 of downwardly inwardly tapering form extend, said flanges 31 being off-set from plate or flange 15 of the bracket 13 by flanges similar to flanges 19 but inclined to the vertical in conformance with the outer side edges of flanges 31. This modified construction thus provides a substantially wedge-shaped lower entering end for the back support 22, which facilitates insertion thereof in either the preferred or modified form of socket and is of particular advantage in the event the socket of bracket 13 is clogged by dirt, or the like. The wedge also facilitates movement of back support 22 to operative supported position in the bracket after it has been initially inserted in the socket. This wedge-shaped back support is adequately and securely positioned and supported by either the preferred or modified forms of the bracket 13.

The invention having been set forth, what is claimed as new and useful is:—

1. The combination with a seat, of a bracket comprising a horizontal plate secured in face contacting engagement with the top face of said seat and a vertical flange secured in face contacting engagement to the rear edge of said seat, said vertical plate having an open ended off-set socket formed therein comprising a pair of downwardly tapered aligned end portions spaced from the plate and an intermediate transversely outwardly expanded portion, and a back rest including a support provided with a central portion having an interfitting transverse configuration and aligned flanges extending laterally of said central portion, and laterally extending ears carried by said support in spaced relation above its lower end, the lateral flanges of said support tapering from said ears to the lower end thereof, said support fitting snugly in said socket with said ears engaging the upper edge of said socket.

2. The combination with a seat, of a bracket comprising a horizontal plate secured in face contacting engagement with the top face of said seat and a vertical plate secured in face contacting engagement to the rear edge of said seat, said vertical plate having a transversely configured outwardly expanded open ended socket formed intermediate thereof and a back rest including a support having an interfitting transverse configuration and fitting snugly in said socket with the outer face thereof in face contacting engagement with the entire inner face of said socket and the inner face of at least a portion thereof engaging said vertical bracket plate above and below said socket, and an enlargement carried by said support and seating on said socket.

3. In combination, a back rest for a seat comprising a support having a central transversely configured portion and laterally extending aligned flanges, a lateral enlargement carried by said support in spaced relation above its lower end, said flanges tapering from said enlargement to the lower end thereof, and means for mounting said back rest including a plate having an off-set open ended socket comprising a central transversely outwardly expanded portion complementary to said transversely configured support portion and lateral downwardly tapered aligned end portions spaced from said plate, said support being insertible in said socket with the outer face of said support in face contacting engagement with the entire inner face of said socket and the inner faces of said flanges in face contacting engagement with said plate adjacent said socket, said enlargement seating on said socket.

4. The combination with a relatively thin horizontal member forming a seat, of a bracket including a vertical member secured to the rear edge of said seat and a vertical open ended socket positioned intermediate the height of said vertical member, said socket being of a height less than the thickness of said seat and positioned between projections of the upper and lower surfaces of said seat, and a back rest detachably carried by said bracket, said back rest having a configuration interfitting with said socket and engaging said vertical member above and below said socket to be positioned in operative relation to said seat solely thereby and in a manner to sustain horizontal stresses applied to said back rest.

5. The combination with a relatively thin horizontal member forming a seat, of a back rest for said seat, and means positioned at and secured to the rear vertical edge of said seat for detachably supporting said back rest in operative upright position, said means engaging one side of said back rest at vertically spaced points and the other side of said back rest intermediate said spaced points, all of said points of engagement lying between projections of the upper and lower faces of said seat whereby said means serves to operatively support said back rest in a manner to sustain horizontal stresses applied thereto.

JAMES A. REYNIERS.